Dec. 10, 1929.  G. A. RAPTIS  1,739,418
CULTIVATOR
Filed Dec. 17, 1928   4 Sheets-Sheet 1
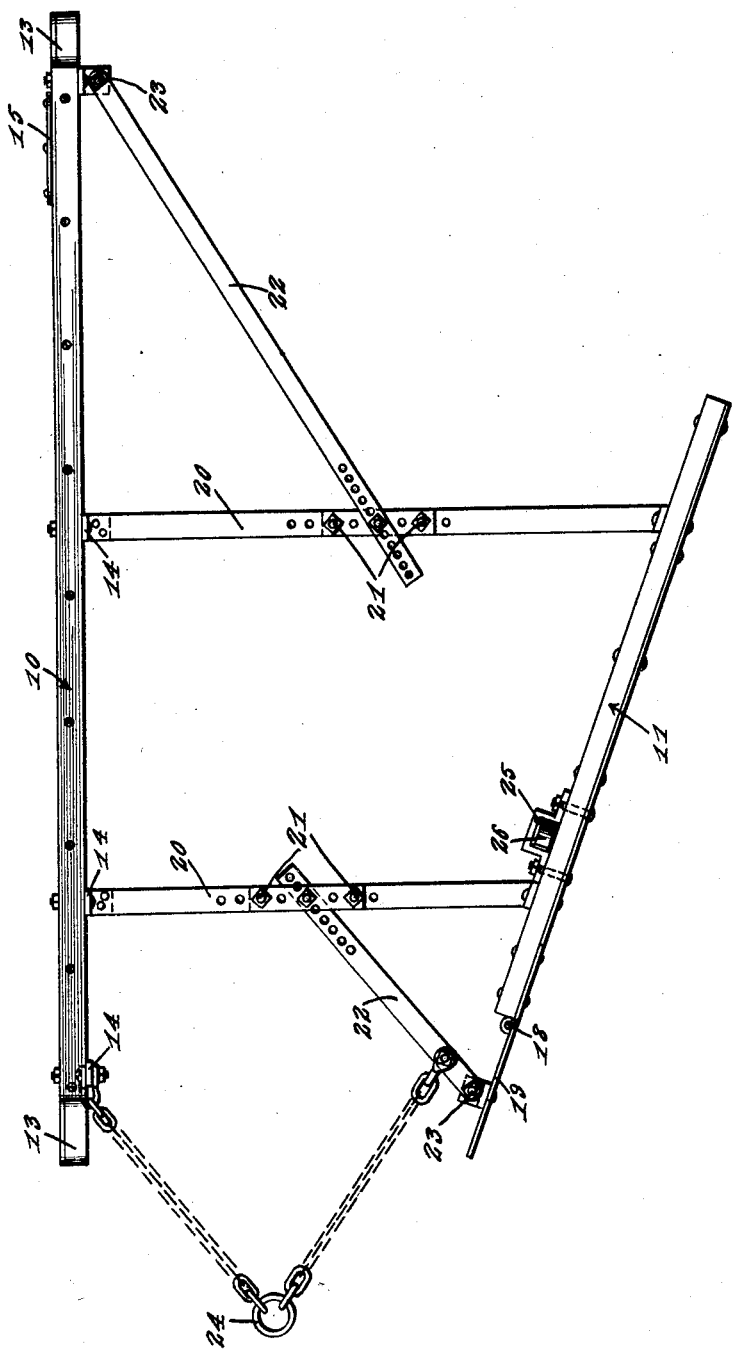
G. A. Raptis, INVENTOR
BY Victor J. Evans
ATTORNEY Dec. 10, 1929.　　　G. A. RAPTIS　　　1,739,418
CULTIVATOR
Filed Dec. 17, 1928　　　4 Sheets-Sheet 2
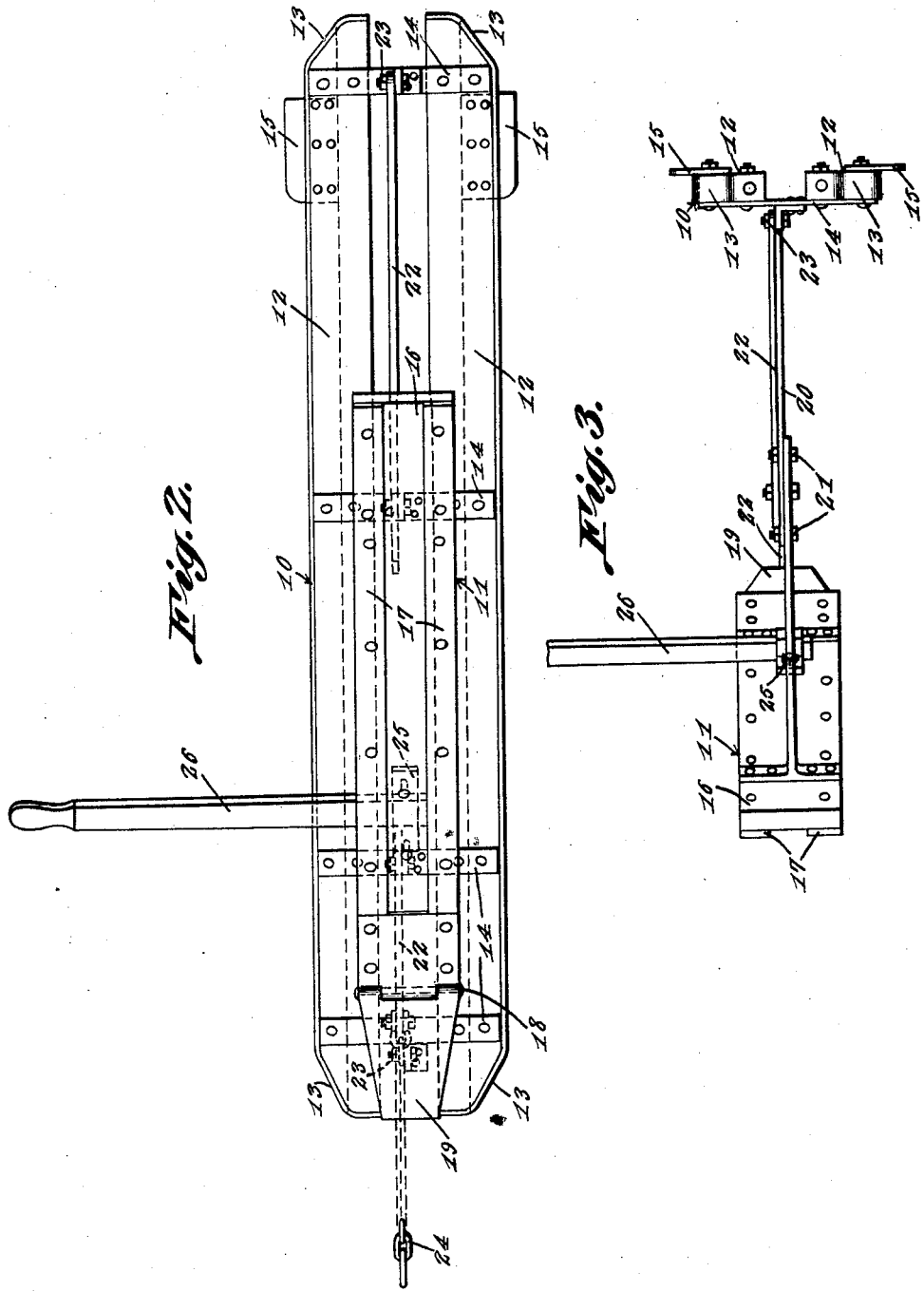
G. A. Raptis, INVENTOR
BY Victor J. Evans
ATTORNEY

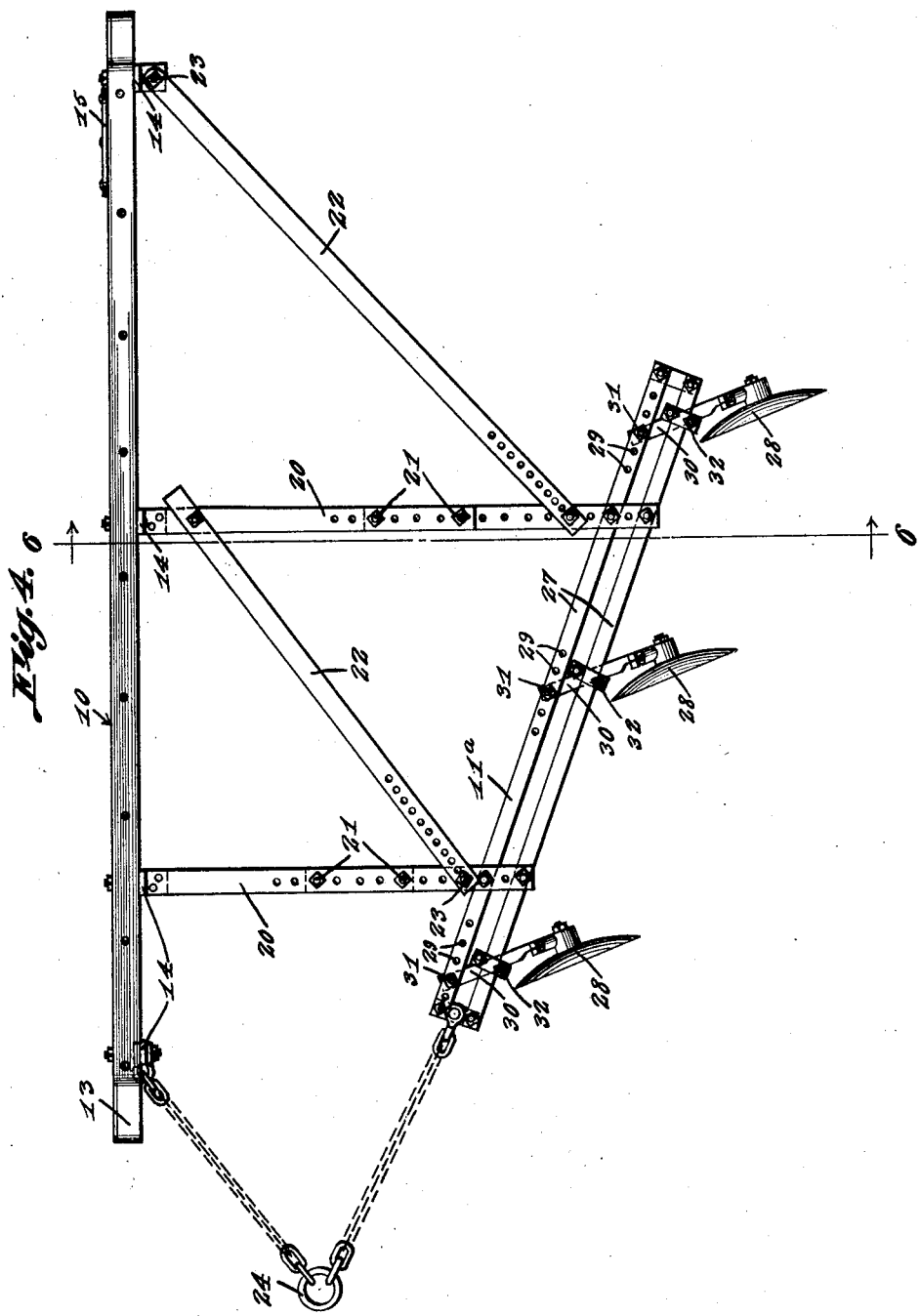

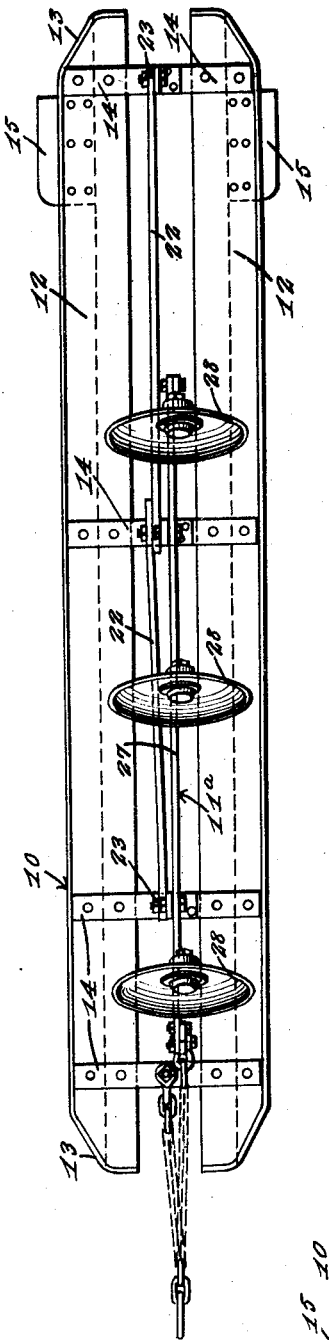

Patented Dec. 10, 1929

1,739,418

UNITED STATES PATENT OFFICE

GUST A. RAPTIS, OF CALEXICO, CALIFORNIA

CULTIVATOR

Application filed December 17, 1928. Serial No. 326,561.

This invention relates to agricultural machines and has for an object the provision of a cultivator which is especially adapted for use upon irrigated land where plants are grown between ridges or raised borders upon the south side of and just below the top of the border.

Another object of the invention is the provision of a cultivator which is designed to smooth the dirt and pull it away from the plants, and which may also be used to cultivate the ground.

Another object of the invention is the provision of a machine, which in addition to the above advantageous features, is simple in construction, efficient in use, and will provide means for smoothing and cultivating land of the character mentioned, the operation being quickly and thoroughly performed without the use of hand labor.

With the above and other objects in view, the invention further includes the following novel features and details of construction, to be hereinafter more fully described, illustrated in the accompanying drawings and pointed out in the appended claims.

In the drawings:—

Figure 1 is a plan view of the invention.

Figure 2 is a side view.

Figure 3 is a rear view.

Figure 4 is a top plan view showing the use of cultivator disks in connection with the machine.

Figure 5 is a side elevation of the machine shown in Figure 4.

Figure 6 is an enlarged fragmentary section taken substantially on the line 6—6 of Figure 4.

Referring to the drawings in detail wherein like characters of reference denote corresponding parts, the machine shown in Figures 1, 2 and 3 comprises a furrow member or guide sledge 10 and a smooth border sledge or beam 11, the latter being spaced from and disposed at an incline with respect to the former.

The furrow member 10 comprises vertically spaced beams 12. The opposite outer edges of these beams define runners whose opposite ends are beveled as shown at 13. The beams are connected by vertical bars 14, so that the member 10 will act as a furrow guide irrespective of which of the beams engage the ground. These beams have secured thereto longitudinally disposed guide blades 15 which extend in opposite directions.

The smooth border sledge or beam 11 comprises an elongated substantially flat member or beam 16 which has bars 17 secured adjacent its opposite edges, while the front end of the border sledge 11 has hingedly secured thereto as shown at 18 a plate 19.

Connecting the furrow member 10 and the border member 11 are bars 20. The opposite ends of these bars are secured centrally of the height of the members 10 and 11, and as the member 11 is of less height than the member 10, the upper and lower edges of the former will be disposed horizontally central between the upper and lower edges of the member 10. The bars 20 are of sectional formation and are adjustably connected as shown at 21 so that the members 10 and 11 may be adjustably spaced apart and the inclination of the member 11 may be adjusted with respect to the member 10. Inclined braces 22 have one of their ends pivotally connected to the members 10 and 11 as shown at 23, the connection of the forward brace 22 with the member 11 being through the hinged plate 19. The opposite or inner ends of the braces 22 are provided with spaced openings so that they may be adjustably connected with the bars 20, so that a rigid and adjustable frame is provided. The forward end of the machine is provided with a draft gear 24.

The border member 11 carries a substantially U-shaped member 25 which removably receives a lever or bar 26. This lever or bar 26 provides means whereby a person riding the cultivator may steady himself, a plank or timber being positioned upon the bars 20 to provide a platform for the rider. The lever 26 is also useful in turning the machine over at the end of each row, the machine operating effectually with either side up.

In the form of the invention shown in Figures 4, 5 and 6, the border member 11[a] comprises horizontally spaced parallel bars

27 which carry disk cultivators 28. For this purpose the innermost bar 27 is provided with spaced bolt openings 29 by means of which the inner ends of arms 30 may be adjustably secured. The disks 28 are carried at the outer ends of the arms 30 and the arms may be pivotally adjusted upon bolts 31. U-shaped clamping bolts 32 which clamp the arms 30 to the outer bar 27 serve to hold said arms 30 in adjusted position. This form of the invention provides means whereby the ground may be cultivated as well as smoothed.

In the form of the invention just described, the plate 19 is dispensed with and the draft gear 24 is connected directly to the border 11ª. The furrow member 10, the bars 20 and the braces 22 are the same as those disclosed in Figures 1, 2 and 3 of the drawings.

The invention is susceptible of various changes in its form, proportions and minor details of construction and the right is herein reserved to make such changes as properly fall within the scope of the appended claims.

Having described the invention what is claimed is:

1. In an agricultural machine, a furrow guide member extending longitudinally of one side of the machine, a relatively inclined border member disposed along the opposite side of said machine, said border member being of less height than the furrow guide member, bars having their opposite ends connected centrally of the height of said members and providing a frame, means to adjustably connect the inner ends of the bars relatively to regulate the width of the frame, inclined braces having their outer ends pivotally secured to the furrow member and border member and their other ends adjustably secured to the bars, and a draft gear for the machine.

2. In an agricultural machine, a furrow guide member extending longitudinally of one side of the machine, a relatively inclined border member disposed along the opposite side of said machine, said border member being of less height than the furrow guide member, bars having their opposite ends connected centrally of the height of said members and providing a frame, cultivator disks extending outwardly from the border member and a draft gear for the machine.

3. In an agricultural machine, a furrow guide member including longitudinally disposed upper and lower runners extending along one side of the machine, means connecting said runners, a border member extending along the opposite side of the machine and inclined with respect to the furrow guide member and being of less height than the latter, bars having their opposite ends connected to the furrow guide member and border members centrally of the heights of said members to dispose the border member on a plane horizontally central of the furrow guide member, cultivator disks positioned centrally and laterally of the border member, and a draft gear for the machine.

In testimony whereof I affix my signature.

GUST A. RAPTIS.